(12) United States Patent
Shimura et al.

(10) Patent No.: US 7,723,460 B2
(45) Date of Patent: May 25, 2010

(54) SHAPE-MEMORY RESIN PERFORMING REMOLDABILITY AND EXCELLENT IN SHAPE RECOVERING PROPERTY, AND MOLDED PRODUCT COMPOSED OF THE CROSS-LINKED RESIN

(75) Inventors: Midori Shimura, Tokyo (JP); Kazuhiko Inoue, Tokyo (JP); Masatoshi Iji, Tokyo (JP)

(73) Assignee: NEC Corporation, Tokyo (JP)

( * ) Notice: Subject to any disclaimer, the term of this patent is extended or adjusted under 35 U.S.C. 154(b) by 1007 days.

(21) Appl. No.: 10/582,675

(22) PCT Filed: Dec. 10, 2004

(86) PCT No.: PCT/JP2004/018490

§ 371 (c)(1),
(2), (4) Date: Jun. 12, 2006

(87) PCT Pub. No.: WO2005/056642

PCT Pub. Date: Jun. 23, 2005

(65) Prior Publication Data

US 2007/0148465 A1    Jun. 28, 2007

(30) Foreign Application Priority Data

Dec. 12, 2003   (JP) .............................. 2003-415258

(51) Int. Cl.
C08G 63/08   (2006.01)
C08G 63/91   (2006.01)
B32B 9/04    (2006.01)
C08J 11/04   (2006.01)
C08K 5/12    (2006.01)

(52) U.S. Cl. ........................ 528/354; 521/40; 428/411.1

(58) Field of Classification Search ................. 528/354; 428/411.1; 521/40

See application file for complete search history.

(56) References Cited

FOREIGN PATENT DOCUMENTS

| JP | 59-053528 | 3/1984 |
|---|---|---|
| JP | 62-192440 | 8/1987 |
| JP | 63-179955 | 7/1988 |
| JP | 02-092914 | 4/1990 |
| JP | 02-133407 | 5/1990 |
| JP | 02-169612 | 6/1990 |
| JP | 02-255830 | 10/1990 |
| JP | 02-258818 | 10/1990 |
| JP | 03-146511 | 6/1991 |

(Continued)

OTHER PUBLICATIONS

Masao Karouji, "Development of material for shape-memory polymer", CMC, pp. 30-43 (1989).

(Continued)

*Primary Examiner*—Duc Truong
(74) *Attorney, Agent, or Firm*—Dickstein, Shapiro, LLP.

(57) ABSTRACT

It is possible to provide a shape-memory molded product having excellent shape-memory properties and recycling efficiency by using a shape-memory resin having a glass transition temperature (Tg) within the range of 40° C. to 200° C. and a dissociation temperature (Td) of a thermo-reversible reaction within the range of 50° C. to 300° C. and satisfying the relationship: $Tg+10°\,C. \leq Td$, wherein the resin is deformed at a temperature of Tg to less than Td, and cross-linked through a thermo-reversible reaction in which a covalent bond is formed by cooling and dissociated by heating.

15 Claims, 3 Drawing Sheets

FOREIGN PATENT DOCUMENTS

| | | |
|---|---|---|
| JP | 06-065460 | 3/1994 |
| JP | 09-221539 | 8/1997 |
| JP | 10-147720 | 6/1998 |
| JP | 11-035675 | 2/1999 |
| JP | 11-106578 | 4/1999 |
| JP | 2000-086849 | 3/2000 |
| JP | 2002-097234 | 4/2002 |
| JP | 2002-256052 | 9/2002 |
| WO | WO 99/42147 | 8/1999 |
| WO | WO 99/42528 | 8/1999 |

OTHER PUBLICATIONS

Engle et al., Macromol. Chem. Phys., vol. C33, No. 3, pp. 239-257 (1993).

Nakane et al., Coloring Material, vol. 67, No. 12, pp. 766-774 (1994).

Nakane et al., Coloring Material, vol. 69, No. 11, pp. 735-742 (1996).

International Search Report dated Feb. 22, 2005.

SHAPE-MEMORY RESIN PERFORMING REMOLDABILITY AND EXCELLENT IN SHAPE RECOVERING PROPERTY, AND MOLDED PRODUCT COMPOSED OF THE CROSS-LINKED RESIN

TECHNICAL FIELD

The present invention relates to a shape-memory resin composition performing remoldability and excellent in shape recovering property. The present invention also relates to a molded product composed of cross-linked resin, a deformed molding, and a method for using the same.

BACKGROUND ART

As a material exhibiting shape-memory properties, alloy materials and resin materials have been known in the art. Shape-memory alloys find use in pipe Joints and straightening teeth, whereas shape-memory resins in thermal contraction tubes and laminate materials, fastening pins, and medical equipment such as a plaster cast. Unlike a shape-memory alloy, a shape-memory resin has the following merits. The resin can be processed into a complicated shape, has a high shape-recovery efficiency, light weight, readily colorable, and low cost. Because of these merits, the shape-memory resin is expected to enlarge the application fields.

A shape-memory resin has the following features. It can be deformed at a predetermined temperature and such a desirably deformed shape can be fixed by cooling it to room temperature, and recovered to its original shape by heating it again. The shape-memory resin is characteristically constituted of a frozen phase, which is composed of a physical or chemical bonded site (cross-linking point), and a reversible phase, which is composed of a non-cross-linked portion and flowable at a predetermined temperature or more (the Tg or melting point in the reversible phase).

The mechanism of a shape-memory resin will be further specifically explained. Memorizing a shape, deforming a molded product, and recovering the memorized shape are performed as described in steps 1 to 3 below. The conceptual view of the mechanism is shown in FIG. 1.

1. Processed by Molding

When a shape-memory resin is processed by a predetermined method (heating, melting, and solidification), an initial state (original form) consisting of a frozen phase and a reversible phase (rigid state) (Stage (a) and a partially magnified view (b) of FIG. 1) is memorized.

2. Deformation of Molded Product

A molded product can be arbitrarily deformed at a temperature, at which only the reversible phase but the frozen phase melts, that is, not less than the Tg or melting point in the reversible phase, thereby converting the reversible phase into a soft state (Stage (c) of FIG. 1); followed by applying external force to the molded product while maintaining its state (Stage (d) of FIG. 1). When the deformed product is cooled to Tg or less or the melting point or less, it is fixed in a deformed state with the reversible phase completely solidified (Stage (e) of FIG. 1).

3. Recovery of the Memorized Shape

In the molded product arbitrarily deformed, the deformed state of the shape is maintained by the reversible phase forcibly fixed in the meantime. Therefore, when the temperature of the deformed product reaches a temperature at which the reversible phase alone melts, the resin exhibits elasticity (rubber like properties) and comes to a stable state. In this way, its original shape is recovered (Stage (c) of FIG. 1). The initial state of the molded product shown in Stage (b) of FIG. 1 is brought back by further cooling to not more than Tg or a melting point.

The frozen phase herein is classified into a thermosetting type or a thermoplastic type depending upon the type of cross-linking structure. The thermosetting type and the thermoplastic type are known to have intrinsic advantages and disadvantages.

The frozen phase of the thermosetting type shape-memory resin is composed of a covalently cross-linked structure. The thermosetting type shape-memory resin has the following advantages. The resin is highly effective in preventing fluidization of a resin, excellent in shape-recovering properties and dimensional stability, and recovers the original shape at a high speed. On the other hand, it has the following disadvantages. Because of covalent cross-linking, it cannot be remolded, in other words, non-recyclable.

For example, as a specific example of a conventional thermosetting shape-memory resin, mention may be made of trans-1,4-polyisoprene (Patent Document 1: Japanese Patent Laid-Open No. 62-192440), which is a resin formed by cross-linking trans-1,4-polyisoprene with sulfur or peroxide. The frozen phase of the resin is a cross-linking site and the reversible phase is a crystalline part of trans-1,4-polyisoprene. The resin is excellent in shape-recovering properties; however, due to covalent cross-linking, remolding cannot be made as described above, and thus the recycling efficiency of the resin is poor.

On the other hand, the frozen phase of the thermoplastic type shape-memory resin is composed of a crystalline part, glass-state region of a polymer, entanglement of polymers, or metal crosslink. Since the frozen phase can melt by heating, the resin can be remolded, that is, recyclable. This is an advantage of the thermoplastic type shape-memory resin. However, since the binding force of the frozen phase of the thermoplastic type shape-memory resin is weaker than the thermosetting type having covalent cross-linking. The thermoplastic type is inferior in shape recovering property to the thermosetting resin.

As an example of a conventional thermoplastic type shape-memory resin, mention may be made of polynorbornene (Patent Document 2: Japanese Patent Laid-Open No. 59-53528). The document describes that a polymer-entangled portion serves as a frozen phase, whereas a non-polymer-entangled portion as a reversible phase, providing shape-recovering properties. However, the shape-memory resin of this type has problems. It takes long to recover the shape. Because of a large molecular weight, processability is low.

Polyurethane (Patent Document 3: Japanese Patent Laid-Open No. 2-92914) is also known as an example. The frozen phase is crystalline phase and the reversible phase is amorphous phase. However, the shape-memory resin of this type also takes long to recover the shape. Furthermore, the tensile strength is extremely low, so that it is difficult to use it in component parts for electronic apparatuses.

A styrene-butadiene copolymer (Patent Document 4: Japanese Patent Laid-Open No. 63-179955) is also known. The frozen phase is a glass state region composed of polystyrene and the reversible phase is a crystalline portion composed of trans-polybutadiene. Also in the shape-memory resin of this type, a long shape-recovery time and a low recovery rate are pointed out as problems.

A method for improving shape-memory properties of the thermoplastic type shape-memory resin has been proposed. For example, Patent Document 5 (Japanese Patent No.

2692195) discloses that a shape-memory resin excellent in shape recovery rate and shape recovery time can be provided by hydrogenating not less than 80% of the olefinic unsaturated bond of a ternary compound system block copolymer, which is analogous to the resin of Patent Document 4. However, in Non-Patent Document 1 (Masao Karouji, "Development of Shape-memory Polymers", CMC, pages 30-43, 1989), the fact that a styrene-butadiene based-thermoplastic shape-memory resin is repeatedly deformed, the recovery rate of a shape-memory resin is reduced, is pointed out as a problem.

Recently, as environmental issue becomes a great matter of concern, the recycling efficiency of a material becomes more important. However, there are no conventional shape-memory resins having not only recycle efficiency but also excellent shape-recovery property, for the reasons set forth above. Therefore, it has been difficult to employ a conventional shape-memory resin to form a molded body requiring recycle efficiency and excellent shape-recovery property, for example, in component parts for electronic apparatuses.

An example in which a thermo-reversible cross-linking structure is introduced into a shape-memory resin, thereby imparting processability and recycle efficiency is shown in Patent Document 6 (Japanese Patent Laid-Open No. 2-258818). The document discloses, as a thermo-reversible covalent cross-linking structure, an ion cross-linking group such as a carboxyl group and a covalent cross-linking structure using the Diels-Alder reaction or a dimerization reaction of a nitroso group. In the claims, a cross-linking body is recited, which is obtained by thermoreversibly cross-linking a base polymer, that is, a block copolymer of an aromatic vinyl monomer and a conjugate diene based monomer, and which is characterized in that the glass-transition temperature (Tg) of the dissociated polymer (the base polymer) of the cross-linked body is higher than the dissociation (cleavage) temperature (Td) of the thermo-reversible crosslink contained in the cross-linked body, and that the glass transition temperature falls within the range of 70° C. to 140° C.

In the document, page 3, lower right column, there is a description reading: "the dissociation temperature of the thermo-reversible crosslink is satisfactory if it is lower than the glass transition temperature of the dissociated polymer, practically, the dissociation temperature is preferably lower by 10° C. or more than the glass transition temperature of the dissociated polymer". In the block copolymer, an aromatic resin having Tg of about 100° C. serves as a frozen phase as is in the case of the styrene-butadiene copolymer (Patent Document 4). On the other hand, a crystalline diene polymer having a melting point lower than Tg of the aromatic resin serves as a reversible phase. The thermo-reversible covalent cross-linking structure is introduced into a double bond of the diene polymer. When the polymer is heated to Td or more, the bond (crosslink) is dissociated. When the polymer is deformed in this state and then cooled to Td or less, rebonding (re-cross-linking) takes place to provide shape-memory properties. Also, when the polymer is heated to not less than Tg of an aromatic resin, the moldability is improved and the polymer can be remolded. In other words, in the shape-memory resin, the resin portion serves as a frozen phase and the crosslink portion serves as a reversible phase as shown in FIG. 2 (Stage (a)). When the shape-memory resin is heated to Td or more, the crosslink is dissociated (Stage (b)). Furthermore, when external force is applied to the resin while maintaining the heating state, the resin is deformed (Stage (c)). When the resin is cooled to less than Td to permit to form a crosslink again, the shape is memorized as shown in Stage (d). In order to return the original shape, the resin is heated again to Td or more to dissociate the crosslink and then cooling it. In the process of remolding, the resin is heated to not less than the Tg of an aromatic resin. As a result, the resin portion of the frozen phase becomes flowable and thus remolding can be made, as shown in Stage (e).

However, since the crosslink is dissociated in a shape-recovery period, the resin is classified into a thermoplastic type. This means that excellent recovery property cannot be obtained and that types of available resin and thermo-reversible binding crosslink structure are limited. Furthermore, since the dissociation temperature of the covalent cross-linking structure is high (Diels-Alder: 120° C.-160° C., nitroso group: 70° C. to 160° C.), the resin and cross-linking site satisfying the conditions of this patent are actually limited. In particular, the temperature range of a shape-memorizing process is extremely limited. From these, this resin is extremely impractical.

Note that, Non-Patent Document 2 (Engle, et al., J. Macromol. Sci. Re. Macromol. Chem. Phys., Vol. C33, No. 3, pages 239-257, 1993) describes, as examples of the thermo-reversible reaction to be used in cross-linking, the Diels-Alder reaction, nitroso dimerization reaction, esterification reaction, ionene reaction, urethanization reaction, and azlactone-phenol addition reaction.

Non-Patent Document 3 (Yoshinori Nakane and Masahiro Ishitoya, et al., Coloring Material, Vol. 67, No. 12, pages 766-774, 1994), Non-Patent Document 4 (Yoshinori Nakane and Masahiro Ishitoya, et al., Coloring Material, Vol. 69, No. 11, pages 735-742, 1996), and Patent Document 7 (Japanese Patent Laid-Open No. 11-35675) describe a thermo-reversible cross-linking structure using a vinylether group.

An example in which a reversible reaction based on the esterification reaction of an acid anhydride is used to improve thermal resistance and recycle efficiency, is described in a document such as Patent Document 8 (Japanese Patent Laid-Open No. 11-106578). To describe more specifically, in this process, a carboxylic anhydride is introduced in a vinyl polymer compound and cross-linked by a linker having a hydroxyl group.

However, none of the documents include descriptions about shape memory properties and applications as a shape-memory resin.

On the other hand, to deal with environment issue not by recycling but by discarding, shape-memory resins composed of various types of biopolymers have been proposed. For example, Patent Document 9 (Japanese Patent Laid-Open No. 9-221539) discloses a biodegradable shape-memory resin composed of an aliphatic polyester resin such as a polylactic resin. However, these are thermoplastic resins, so that shape recovering properties and recovery rate are insufficient.

A shape-memory resin using a biodegradable thermosetting or photosetting resin is described in Patent Document 10 (National Document of International Patent No. 2002-503524). FIG. 5 of the patent document shows that a shape is memorized by photo-cross-linking and the shape is recovered by dissociation of a crosslink with heat or light. However, no mention is made of recycling of the biodegradable thermosetting or photosetting resin.

Patent Document 1: Japanese Patent Laid-Open No. 62-192440

Patent Document 2: Japanese Patent Laid-Open No. 59-53528

Patent Document 3: Japanese Patent Laid-Open No. 2-92914

Patent Document 4: Japanese Patent Laid-Open No. 63-179955

Patent Document 5: U.S. Pat. No. 2,692,195

Patent Document 6: Japanese Patent Laid-Open No. 2-258818

Patent Document 7: Japanese Patent Laid-Open No. 11-35675

Patent Document 8: Japanese Patent Laid-Open No. 11-106578

Patent Document 9: Japanese Patent Laid-Open No. 9-221539

Patent Document 10: National Document of International Patent No. 2002-503524

Non-Patent Document 1: Masao Karouji, "Development of material for shape-memory polymer", CMC, pages 30-43, 1989

Non-Patent Document 2: Engle, et al., J. Macromol. Sci. Re. Macromol. Chem. Phys., Vol. C33, No. 3, pages 239-257, 1993

Non-Patent Document 3: Yoshinori Nakane and Masahiro Ishitoya, et al., Coloring Material, Vol. 67, No. 12, pages 766-774, 1994

Non-Patent Document 4: Yoshinori Nakane and Masahiro Ishitoya, et al., Coloring Material, Vol. 69, No. 11, pages 735-742, 1996

DISCLOSURE OF THE INVENTION

Problems to be Solved By The Invention

To solve the aforementioned problems, an object of the present invention is to provide a molded body composed of a shape-memory resin performing remoldability and excellent in shape-recovering properties.

Means for Solving the Problems

To attain the aforementioned object, according to the present invention, there is provided a molded product composed of a shape-memory resin, which becomes a thermosetting type when using and becomes a thermoplastic type when molding and remolding.

The present inventors found that a shape-memory resin cross-linked by a thermo-reversible covalent bonding, which was coupling at a temperature of not less than the Tg of the resin and which was dissociated at a temperature of a molding temperature, can be used as a molded product, such as a component part for an electronic apparatus requiring shape-recovering property and remolding properties.

More specifically, the present invention relates to a shape-memory resin having a glass transition temperature (Tg) within the range of 40° C. to 200° C. and cross-linked by a thermo-reversible reaction in which a covalent bond is formed by cooling and dissociated by heating, wherein a dissociation temperature (Td) of the thermo-reversible reaction is 50° C. to 300° C. and satisfying the relationship: Tg+10° C.≦Td; and a deforming temperature at shape memorizing and shape recorvering is not less than Tg and less than Td.

To be more specifically, there is provided a shape-memory resin bringing a covalently thermo-reversible reaction into a cross-linking. The terms "thermo-reversible reaction" means a reaction in which the covalent bond is dissociated by a predetermined temperature and rebonded by cooling. When the resin is cross-linked by the thermo-reversible reaction, the thermo-reversible cross-linking serves as a frozen phase and the backbone chain as a reversible phase, providing shape-memory properties. Furthermore, the resin acts as a thermosetting resin in the operating temperature range since it is covalently cross-linked, whereas it acts as a thermoplastic resin in molding and remolding temperature regions since the crosslink is dissociated. Therefore, the resultant shape-memory resin has excellent shape-recovering properties and advantages such as excellent remoldability and recycling efficiency. Furthermore, the resin, when it is cooled, returns to a thermosetting type by rebonding, that is, goes back to the same shape-memory resin before remolding. Therefore, when it is repeatedly deformed, the shape recovery rate does not decrease. Furthermore, when a biodegradable resin is used as a backbone chain, environmental burden can be reduced.

EFFECTS OF THE INVENTION

The shape-memory resin of the present invention is excellent in shape-recovering properties since it serves as a thermosetting resin in shape-memorizing and shape-recovering operations, and excellent in molding and remolding properties since it serves as a thermoplastic resin in molding and remolding operations. Therefore, it is useful as a molded product for a component part for an electronic apparatus used around room temperature.

BEST MODE FOR CARRYING OUT THE INVENTION

The present invention will be now described in detail below.

Figure 1:
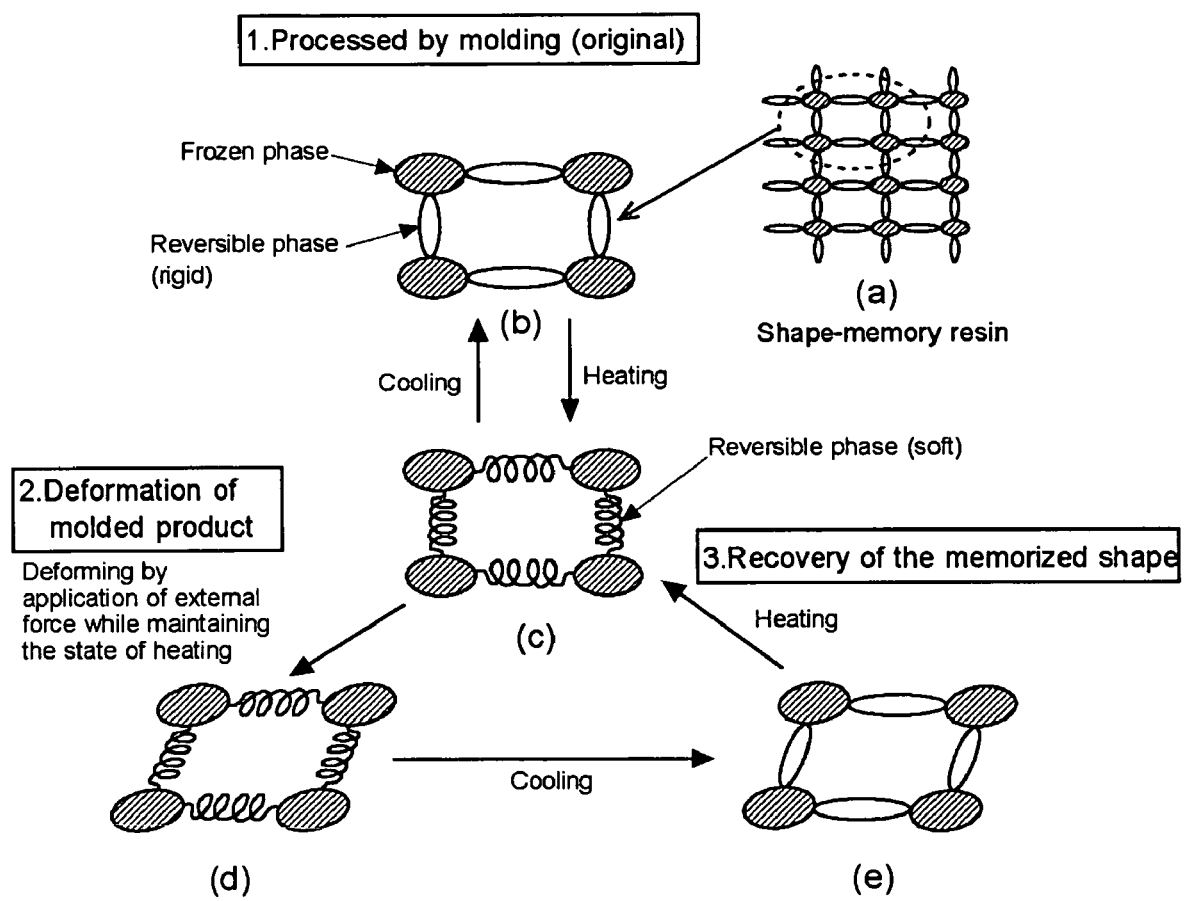
FIG. 1 is a conceptual view for explaining the principal how to memorize a shape in a conventional shape-memory resin.
Figure 2:
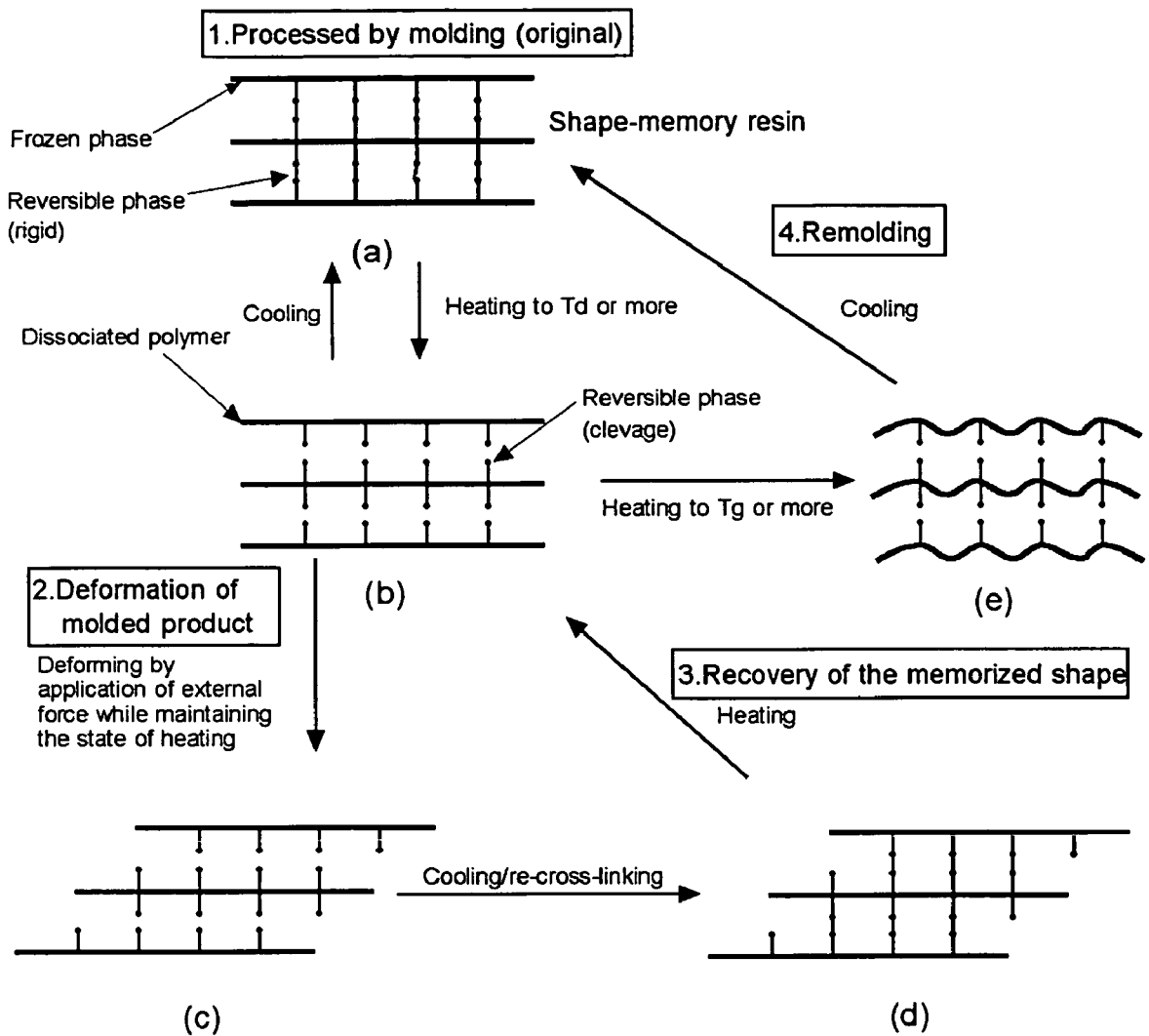
FIG. 2 is a conceptual view for explaining the principal how to memorize a shape and how to remold in a conventional shape-memory resin having a thermo-reversible cross-linking structure introduced therein.
Figure 3:
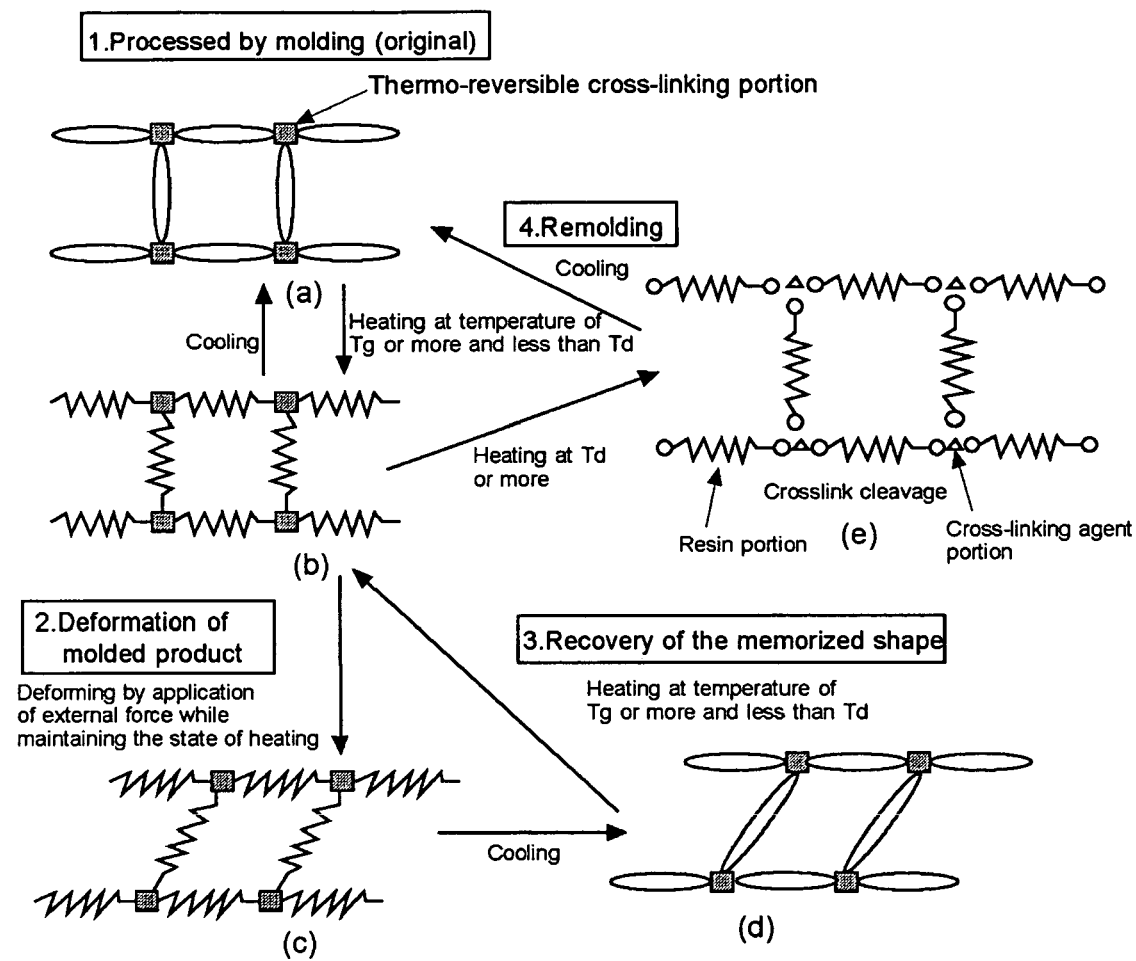
FIG. 3 is a conceptual view for explaining the principal how to memorize a shape and how to remold in a shape-memory resin according to the present invention.

The mechanism of a shape-memory resin according to the present invention will be explained more specifically. Memorizing a shape, deforming a molded product, recovering the memorized shape, and remolding are performed as described in the steps 1 to 4 below. The conceptual view is shown in FIG. 3.

1. Molding Process

When a memory-shape resin according to the present invention is melted at a dissociation temperature (Td) or more of the thermo-reversible crosslink portion and formed into a predetermined shape, an initial state (original shape) (Stage (a)) composed of a frozen phase (thermo-reversible cross-linking portion) and a reversible phase (resin portion: rigid). The shape-memory resin of the present invention becomes thermoplastic when molded, and thus excellent in moldability.

2. Deformation of a Molded Product

To deform the molded product arbitrarily, it is heated to not less than a temperature at which only the reversible phase is softened without dissociating the thermo-reversible crosslink portion of the frozen phase, that is, not less than Tg and less than Td of the resin, thereby rendering a reversible phase (soft) (Stage (b)). Then, external force is applied to the resin while maintaining this state to deform it (Stage (c)). When the molded product thus deformed is cooled to less than Tg, the reversible phase is also completely solidified, thereby fixing the deformed shape (Stage (d)).

3. Recovering of Memorized Shape

The shape of the arbitrarily deformed product can be maintained by the reversible phase forcibly fixed in the meantime. Therefore, when the temperature is increased by heating and reaches a temperature (not less than Tg and less than Td) at which only the reversible phase is softened, the resin exhibits rubber-like properties and comes to a stable state. In this way, its original shape is recovered (Stage (b)). At this time, since the thermo-reversible crosslink portion of the frozen phase is a covalently bonding, excellent recovery power can be exhibited. When the product is further cooled to less than Tg, the product returns to a molded product of the initial state as shown in Stage (a).

4. Remolding

To remold, the resin is heated to a temperature of not less than Td of the thermo-reversible crosslink portion to dissociate the crosslink, thereby rendering the resin in a molten state. Then, the resin is remolded into a desired shape, in the same manner as in Step 1 above. Stage (e) of FIG. 3 shows that the thermo-reversible cross-linking portion is dissociated into a resin portion and a cross-linking agent portion. However, the resin portions can be directly cross-linked without using the cross-linking agent.

The resin that is to be selected is one having a Tg within the range from a threshold temperature, at which a molded resin product such as a component part for an electronic apparatus sufficiently works to not more than the Td of the thermo-reversible reaction to be applied. The threshold temperature varies depending upon the material to be used; however, the Tg of the resin is preferably from 40° C. to 200° C. When the Tg is less than 40° C., the rigidity at room temperature is low, and thus, the shape stability is low. In contrast, when the Tg is higher than 200° C., not only moldability but also processability is low as well as a large amount of energy is required. Thus, the Tg higher than 200° C. is unfavorable in productivity and economic points of view. Further preferably, the Tg of the resin is from 40° C. to 100° C., and further, from 40° C. to 80° C. This is because when the user memorizes a shape, it is conceivable to use a dryer or hot water as a practical heating means. In particular, heating is preferably performed with hot water, since the temperature can be relatively accurately controlled within the temperature range of 100° C. or less. On the other hand, when Tg is 100° C. or more, a simple heating means cannot be used. This case may be less practical. In the case where a product is for wearing or used in direct contact with a human body, the Tg is preferably 80° C. or less in order to prevent skin burns. When the Tg of the resin is Td or more, crosslink is dissociated before the resin is softened, so that excellent shape-memory properties cannot be obtained. The resin preferably has a Tg lower by 10° C. or more than the Td of the thermo-reversible reaction to be applied.

The dissociation temperature (Td) of a bond formed by thermo-reversible reaction applied to a cross-linking is set within the range of 50° C. to 300° C. Unless the frozen phase and reversible phase are in a cured state in a practical temperature range, dynamic characteristics available in component parts for electronic apparatus cannot be obtained. Accordingly, if the Td is less than 50° C., it is difficult to apply the resin to a component part for an electronic apparatus in terms of heat resistance. On the other hand, a Td in excess of 300° C. is not adequate since thermolysis of the resin and an operational problem take place.

Then, Td is set at Tg of the resin +10° C. or more. In shape-memorizing operation, a resin is heated at a temperature of Tg or more to soften the reversible phase to deform it. If cross-linking is not affected in the frozen phase at the temperature, the flow-movement of the resin cannot be stopped, preventing the memorization of a shape. To enlarge the temperature range for deformation, Td is desirably not less than Tg+20° C., and more preferably, not less than Tg+30° C.

Furthermore, the temperature during shape deformation and recovery operations is set within the range of not less than Tg and less than Td. This is because the molecular movement of a resin does not take place at a temperature of less than Tg, preventing memorization and recovery of a shape. On the other hand, at a temperature of Td or more, binding dissociation takes place due to the thermo-reversible reaction, flow-movement of the resin cannot be stopped, so that the shape previously acquired disappears.

The temperature range of the remolding operation is set at Td or more, preferably within the range of Td to less than thermolysis initiation temperature of the resin. This is because binding dissociation takes place due to the thermo-reversible reaction at Td or more, thereby moldability of the resin improves.

The aforementioned conditions are summarized as below.

$$40° C. \leq Tg \leq 200° C. \tag{1}$$

$$50° C. \leq Tg \leq 300° C. \tag{2}$$

$$Tg+10° C. \leq Td \tag{3}$$

$$Tg \leq Tt < Td \leq Tf < Tdec \tag{4}$$

In the equation (4), Tt represents a deformation temperature, Tf is molding and remolding temperature, and Tdec is a decomposition temperature of a resin.

Excellent shape memory properties and recycling efficiency can be attained as long as the thermo-reversible reaction contains one reaction type. The thermo-reversible reaction may contain two or more types. When two or more types of reactions are contained and Tds of the individual reactions differ from each other, if the highest Td is represented by Td1, and the lowest temperature is represented by Td2, the equations (3) and (4) are expressed as follows:

$$Tg+10° C. \leq Td2 \tag{3'}$$

$$Tg \leq Tt < Td2 < Td1 \leq Tf < Tdec \tag{4'}$$

When there is a difference of 10° C. or more between adjacent two Td values (Tda, Tdb), that is, if the following relationship is established, $$Tda+10° C. < Tdb \tag{5}$$

another shape can be memorized in addition of the shape memory at Tt. When another shape is memorized, if the deformation temperature is represented by Tt1, the following relationship is established.

$$Tt < Tda \leq Tt1 < Tdb \tag{6}$$

Furthermore, when various types of polymers are blended, cross-linking structures different in component part are formed. In other words, when a so-called interpenetration network is formed, a plurality of shapes can be memorized.

In the present invention, as a preferable thermo-reversible reaction is at least one type selected from the group consisting of Diels-Alder type, nitroso dimer type, acid anhydride ester type, urethane type, azlactone-hydroxyaryl type and carboxyl-alkenyloxy type.

(Introduction of Functional Group Into Resin)

The functional group required for the covalent thermo-reversible reaction may be introduced into an end of or the inside of a molecular chain of a resin material (precursor). Further, the method for introducing the functional group includes an addition reaction, condensation reaction and copolymerization reaction or the like.

For example, as the method for introducing a functional group into the inside of a molecular chain, various methods are known including carboxylation and nitration of polystyrene. Furthermore, halogenation of polystyrene is also known. A requisite functional group can be introduced by use of conversion into an amine group and various chemical reactions of a halogen group (see "Polymer Synthesis/Reaction [3]", p. 13-, Kyoritsu Shuppan Co., Ltd.).

A resin having a functional group in the main chain may be used. For example, to a polymer having a hydroxyl group such as polyvinyl alcohol, a functional group can be introduced by an esterification or etherification manner. Furthermore, a resin such as polymethacrylic acid having a carboxylic acid group, various chemical reactions of carboxyl group such as esterification can be applied. Furthermore, it is effective that these resins are copolymerized with a resin having no functional group.

As a method for introducing a functional group into a molecular chain end, the functional group can be introduced during polymerization by use of a terminal-blocking agent. For example, since the end of a living polymer such as styrene is a highly reactive carboanion, it can approximately quantitatively react with carbon dioxide gas, ethylene oxide, halogenated alkyl derivative having a functional group protected with a protecting group to introduce a carboxylic acid group, hydroxyl group, amino group, and vinylether group into the end of a resin chain. Furthermore, using a polymerization-initiating agent having a functional group, the functional group can be introduced into the end of a resin chain.

To a polyester based resin such as polycarbonate and polylactic acid, it is effective to introduce a functional group by an esterification reaction. The esterification reaction can be performed by a reagent such as a carbodiimide in addition to an acid or an alkali catalyst. Furthermore, the esterification can be performed by converting a carboxyl group into an acid chloride by use of thionyl chloride or allyl chloride and thereafter by reacting the acid chloride with a hydroxyl group. Note that in the case of polyesters synthesized from dicarboxylic acid and diol as raw materials, all end groups of a molecular chain can be changed into hydroxyl groups by controlling a molar ratio of diol to dicarboxylic acid to be more than 1 in the raw materials.

Furthermore, the end can be converted into a hydroxyl group by a transesterification. To explain more specifically, when a transesterification is performed between a polyester resin and a compound having not less than two hydroxyl groups, another polyester resin having a terminal hydroxyl group can be obtained.

As a compound having a hydroxyl group, it is particularly desirable to use a compound having not less than three hydroxyl groups since a crosslink portion having a three dimensional cross-linking structure can be formed. For example, when transesterification is performed between an ester bond of polylactic acid and pentaerythritol, polyester having four hydroxyl groups at the end of a molecular chain can be obtained.

Examples of the compound having not less than two hydroxyl groups include dihydric alcohols such as ethylene glycol, propylene glycol, dipropylene glycol, 1,3- and 1,4-butanediol, and 1,6-hexanediol; trihydric alcohols such as glycerin, trimethylolpropane, trimethylolethane, and hexane triol; tetrahydric alcohols such as pentaerythritol, methyl glycoside, and diglycerin; polyglycerins such as triglycerin and tetraglycerin; polypentaerythritols such as dipentaerythritol and tripentaerythritol; cycloalkane polyols such as tetrakis (hydroxymethyl)cyclohexanol; and polyvinyl alcohol. Furthermore, mention may be made of sugar alcohols such as adonitol, arabitol, xylitol, sorbitol, mannitol, iditol, talitol, and dulcitol; and saccharides such as glucose, mannoseglucose, mannose, fructose, sorbose, sucrose, lactose, raffinose, and cellulose. As a polyphenol, mention may be made of monocyclic polyphenols such as pyrogallol, hydroquinone, and phloroglucin; bisphenols such as bisphenol A, and bisphenol sulfone; and a condensation product (novorak) between a phenol and formaldehyde.

A resin having a terminal carboxylic acid and a compound having an unreacted hydroxyl group can be easily removed by purification.

A hydroxyl group can be converted into a phenolic hydroxyl group by esterification of a precursor and a precursor modified with a hydroxyl group with hydroxybenzoic acid.

When a carboxylic group is required, a hydroxyl group of the above compounds can be converted into a carboxylic group by bonding a compound having a difunctional or higher functional carboxylic acid to the hydroxyl group by the esterification reaction as mentioned above. In particular, if an acid anhydride is used, a precursor having a carboxylic group can be easily prepared. Examples of the acid anhydride that can be used include pyromellitic anhydride, trimellitic anhydride, phthalic anhydride, hexahydrophthalic anhydride, maleic anhydride and derivatives of these.

(Chemical Structure of Cross-linking)

A cross-linking is constituted of first and second functional groups, which are dissociated by heating and covalently bonded by cooling. When a resin is solidified at a temperature lower than that of a melt processing, the first functional group and the second functional group forms a covalent crosslink. The cross-linking is dissociated into the first functional group and the second functional group when temperature increases to a predetermined temperature or more such as melt processing temperature. The bonding reaction and dissociation reaction of the cross-linking reversibly proceeds along with temperature change. Note that the first functional group and the second functional group may be the same or different. When two identical functional groups are symmetrically bonded to from a crosslink, they may be treated as the first functional group and the second functional group, respectively.

(1) Diels-Alder Type Reaction

A Diels-Alder [4+2] cyclization reaction is used. A conjugated diene and dienophile are introduced as functional groups and cross-linked by a thermo-reversible reaction to obtain a shape-memory resin. Examples of the conjugated diene that serves as a functional group include a furan ring, thiophene ring, pyrrole ring, cyclopentadiene ring, 1,3-butadiene, thiophen-1-oxide ring, thiophene-1,1-dioxide ring, cyclopenta-2,4-dienone ring, 2H-pyran ring, cyclohexa-1,3-diene ring, 2H-pyran-1-oxide ring, 1,2-dihydropyridine ring, 2H-thiopyran-1,1-dioxide ring, cyclohexa-2,4-dienone ring, pyran-2-one ring and substituted radicals of these. As the dienophile, an unsaturated compound, which can perform an addition reaction with the conjugated diene to give a cyclic compound, can be used. For example, a functional group of the dienophile includes a vinyl group, acetyl group, allyl group, diazo group, nitro group and substituted radicals of these. The conjugated diene may serves as a dienophile, in some cases.

Of them, when cyclopentadiene is used in a cross-linking reaction, the Td becomes a range between 150° C. and 250° C. Cyclopentadiene acts not only as a conjugated diene but also as a dienophile. Dicyclopentadiene dicarboxylic acid, which is a dimer of cyclopentadiene carboxylic acid, can be obtained from commercially available cyclopentadienyl sodium (see E. Rukcenstein et al., J. Polym. Sci. Part A: Polym. Chem. Vol. 38, pages 818-825, 2000). The dicyclopentadiene dicarboxylic acid is introduced as a cross-linking by an esterification reaction into a precursor having a hydroxyl group and a precursor modified by a hydroxyl group, at a site at which a hydroxyl group is present.

Furthermore, if 3-maleimide propionic acid and 3-furflyl propionic acid are used, a thermo-reversible reaction is performed at Td of 80° C. Such a compound can be easily introduced as a cross-linking by an esterification reaction into a precursor having a hydroxyl group and a precursor modified with a hydroxyl group at a site at which the hydroxyl group is present.

In the esterification reaction for introducing a cross-linking, a catalyst such as a carbodiumide may be used in addition to an acid or an alkali. Alternatively, after a carboxyl group is converted into an acid chloride with thionyl chloride or ally chloride, the acid chloride may be reacted with a hydroxyl group to perform esterification. If an acid chloride is used, since it can easily react with an amino group, a cross-linking can be introduced to an amino acid and an amino group of its derivative.

A maleimide derivative serving as a dienophile can be synthesized from a polyamine having at least two amino groups per molecule. Examples of the polyamine include aliphatic amines such as trimethylenediamine, tetramethylenediamine, hexamethylenediamine, xylylenediamine, 3,9-bis(3-aminopropyl)-2,4,8,10-tetraoxaspiro[5,5]undecane, bis(4-amiocyclohexyl)methane and tris(2-aminoethyl) amine; aromatic amines such as m-phenylenediamine, p-phenylenediamine, 4,4'-diaminodiphenylmethane, 4,4'-diaminodiphenylsulfone, 4,4'-diaminodiphenyl ether, 4,4'-diaminodiphenyl sulfide, 3,3'-diaminodiphenylsulfone, 2,2-bis-(4-aminophenyl)propane, bis-(4-aminophenyl)diphenylsilane, bis-(4-aminophenyl)methylphosphine oxide, bis-(3-aminophenyl)methylphosphine oxide, bis-(4-aminophenyl)-phenylphosphine oxide, bis-(4-aminophenyl)phenylamine, 1,5-diaminonaphthalene, 2,4-diaminotoluene, 2,6-diaminotoluene, 3,3'-dimethyl4,4'-diaminophenylmethane, 2,2'-dimethyl-4,4'-diaminophenylmethane, 3,3'-5,5'-tetramethyl-4,4'-diaminodiphenylmethane, 3,3'-diethyl-4,4'-diaminodiphenylmethane, 3,3'-5,5'-tetraethyl-4,4'-diaminophenylmethane, 3,3'-di-n-butyl-4,4'-diaminodiphenylmethane, 3,3'-di-tert-butyl-4,4'-diaminodiphenylmethane, 2,2-bis[4-(4-aminophenoxy)phenyl]propane, bis[4-(4-aminophenoxy)phenyl]sulfone, bis(3-chloro-4-aminophenyl)methane, triaminobenzene, triaminotoluene, triaminonaphthalene, triaminodiphenyl, triaminopyridine, triaminophenyl ether, triaminodiphenylmethane, triaminodiphenylsulfone, triaminobenzophenone, triaminophenyl orthophosphate, tri(aminophenyl)phosphine oxide, tetraaminobenzophenone, tetraaminobenzene, tetraaminonaphthalene, diaminobenzidine, tetraaminophenyl ether, tetraaminophenylmethane, tetraaminophenylsulfone, bis(diaminophenyl)pyridine and melamine; aromatic polyamines obtained by the condensation reaction between aniline and formaldehyde; tetrafunctional aromatic polyamines, which is a reaction product between an aromatic dialdehyde and an aromatic amine; aromatic polyamines obtained from a mixture of aromatic dialdehyde and formaldehyde and an aromatic amine; polymers of vinyl aniline; aliphatic polyamines such as polyallyl amine, polylysin, polyornithine, polyethylene imine, and polyvinyl amine; and naturally occurring amino polysaccharides such as chitin and chitosan. A naturally occurring amino compound is preferable as a raw material for a resin from an environmental point of view.

The Diels-Alder reaction is performed between these functional groups, for example, a pair of cyclopentadienyl groups, thermo-reversible cross-linking structure is formed, as shown in the following general reaction scheme (I).

[Formula 1]

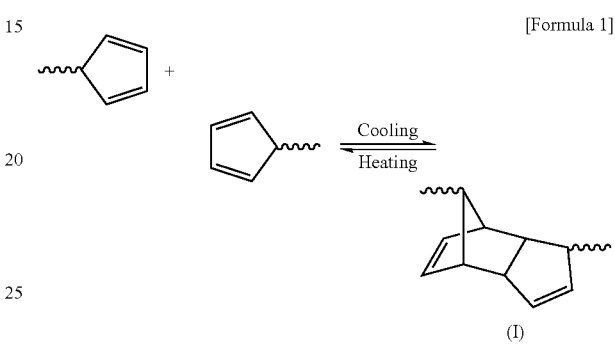

(2) Nitroso Dimerization Reaction

In a general reaction scheme (II), two nitroso groups form a nitroso dimer by cooling to obtain a crosslink. The Td of the crosslink is 110° C. to 150° C.

For example, when a dimer of 4-nitroso-3,5-benzyl acid (a synthetic method for a dimer of 4-nitroso-3,5-dichlorobenzoyl chloride is described in U.S. Pat. No. 3,872,057) is reacted with a hydroxyl group of a precursor having a hydroxyl group or a hydroxyl group of a precursor modified with a hydroxyl group, a thermo-reversible cross-linking can be easily introduced into a site at which a hydroxyl group is present. When an acid chloride is used, since the acid chloride can easily react with an amino group, a cross-linking can be introduced into an amino acid and an amino group of its derivative.

The dimerization reaction of nitroso groups forms a thermo-reversible cross-linking structure, as shown in the following general reaction scheme (II).

[Formula 2]

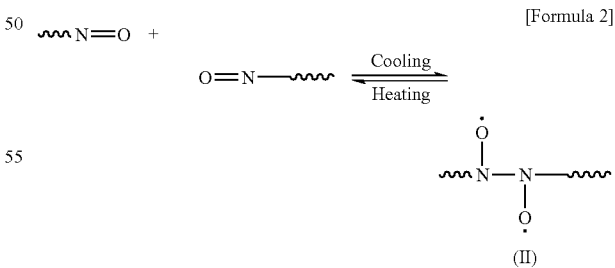

(3) Acid Anhydride Ester Reaction (Reaction Between an Acid Anhydride Group and Hydroxyl Group)

An acid anhydride and a hydroxyl group can be used in a cross-linking reaction. As an acid anhydride, use may be made of aliphatic carboxylic acid anhydride and aromatic carboxylic acid anhydride. Furthermore, both a cyclic acid anhydride group and non-cyclic anhydride group may be used; however, a cyclic acid anhydride group may be preferably used. For example, maleic anhydride group, phthalic anhydride group, succinic anhydride group, and glutaric anhydride group are mentioned as the cyclic acid anhydride group. The non-cyclic acid anhydride group, for example, includes acetic anhydride group, propionic anhydride group, and benzoic anhydride group. Of them, maleic anhydride group, phthalic anhydride group, succinic anhydride group, and glutaric anhydride group, pyromellitic anhydride group, trimellitic anhydride group, hexahydrophthalic anhydride group, acetic anhydride group, propionic anhydride group, benzoic anhydride group and substituents of these are preferable as an acid anhydride which can react with a hydroxyl group to form a cross-linking structure.

As the hydroxyl group, use may be made of a hydroxyl group of a precursor having a hydroxyl group and a hydroxyl group of a precursor having a hydroxyl group introduced by various reactions. Furthermore, a hydroxyl compound such as a diol and a polyol may be used as a cross-linking agent. Moreover, a diamine and a polyamine may be used as a cross-linking agent. When an acid having at least two acid anhydride groups such as pyromellitic anhydride is used as an acid anhydride, it can be used as a cross-linking agent for a precursor having a hydroxyl group and a precursor modified with a hydroxyl group.

A compound having at least two maleic anhydride groups can be easily obtained by copolymerizing maleic anhydride with an unsaturated compound through a vinyl polymerization (see, Japanese Patent Laid-Open No. 11-106578 (Patent Document 8), and Japanese Patent Laid-Open No. 2000-34376). This can be also used as a cross-linking agent for a precursor having a hydroxyl group and a precursor modified with a hydroxyl group.

An acid anhydride as mentioned above and a hydroxyl group can form a thermo-reversible cross-linking structure as shown in the following general reaction scheme (III). In the general reaction scheme (III), an ester is formed between an acid anhydride group and a hydroxyl group by cooling and serves as a crosslink. The Td of the crosslink is 260° C.

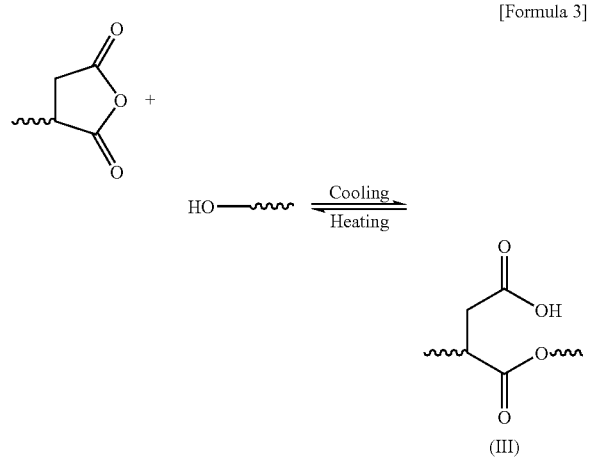

[Formula 3]

(4) Urethane Type Reaction (Reaction Between an Isocyanate Group and an Active Hydrogen Group)

A thermo-reversible crosslink can be formed from a reaction of an isocyanate group with an active hydrogen group. For example, a polyvalent isocyanate, which is used as a cross-linking agent, can be reacted with a hydroxyl group of a precursor or a derivative thereof, amino group, or phenolic hydroxyl group. Furthermore, a molecule having at least two functional groups selected from the group consisting of a hydroxyl group, amino group, and phenolic hydroxyl group may be added as a cross-linking agent. Moreover, a catalyst may be added to control the dissociation temperature to fall within a desired range. Additionally, dihydroxy benzene, dihydroxy biphenyl, and a phenol resin may be added as a cross-linking agent.

A polyvalent isocyanate, which is used as a cross-linking agent, can be reacted with a hydroxyl group of a precursor or a derivative thereof, amino group or phenolic hydroxyl group. Additionally, dihydroxy benzene, dihydroxy biphenyl, and a phenol resin can be added as a cross-linking agent. As the polyvalent isocyanate, tolylene diisocyanate (TDI) and its polymer, 4,4'-diphenylmethane isocyanate (MDI), hexamethylene diisocyanate (HMDI), 1,4-phenylene diisocyanate (DPDI), 1,3-phenylene diisocyanate, xylylene diisocyanate, lysine diisocyanate, 1-methylbenzene-2,4,6-triisocyanate, naphthalene-1,3,7-triisocyanate, biphenyl-2,4,4'-triisocyanate, triphenylmethane-4,4'4"-triisocyanate, tolylene diisocyanate, lysine triisocyanate or the like can be used.

To adjust the dissociation temperature, an organic compound such as 1,3-diacetoxytetrabutyldistanoxane, an amine, and metal soap may be used as a dissociation catalyst.

An urethanization reaction involving a functional group as mentioned above proceeds as shown in the following general reaction scheme (IV) to form a thermo-reversible cross-linking structure. In the general reaction scheme (IV), a phenolic hydroxyl group reacts with an isocyanate group by cooling to form urethane, which serves as a crosslink. The Td of the crosslink is from 120° C. to 250° C. and can be controlled by a catalyst.

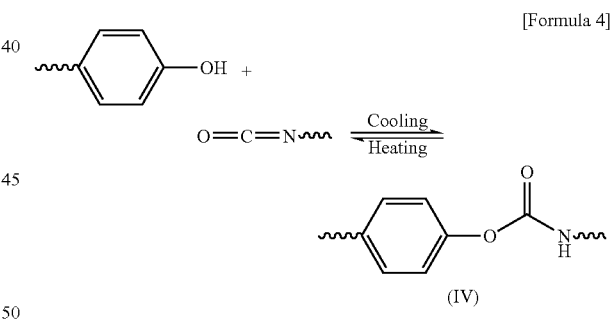

[Formula 4]

(5) Azlactone-hydroxyaryl Reaction (Reaction Between Aziactone and a Phenolic Hydroxyl Group)

Examples of an aryl group include a phenyl group, tolyl group, xylyl group, biphenyl group, naphthyl group, anthryl group, phenanthlyl group, and groups derived from these groups. A phenolic hydroxyl group bonded to these groups reacts with an azlactone structure, which is contained in a group with which a cross-linking structure is to be formed. As a compound having a phenolic hydroxyl group, use may be made of a precursor having a phenolic hydroxyl group and a precursor modified with hydroxyphenols.

As an azlactone structure, use preferably is made of polyvalent azlactones such as 1,4-(4,4'-dimethylazlactyl)butane, poly(2-vinyl-4,4'-dimethylazalactone), bisazlactone benzene, and bisazlactone hexane.

Furthermore, bisazlactyl butane etc., which form a crosslink by an azlactone-phenol reaction, may be used. These are described, for example, in the aforementioned Non-Patent Document 1.

These functional groups form a thermo-reversible cross-linking structure as shown in the following general reaction scheme (V). In the general reaction scheme (V), an azlactone group and a phenolic hydroxyl group are covalently bonded by cooling to form a crosslink. The Td of the crosslink is from 100° C. to 200° C.

[Formula 5]

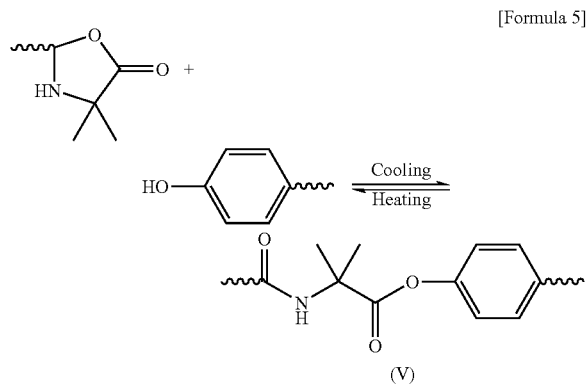

(V)

(6) Carboxyl-alkenyloxy Type Reaction

A compound having a carboxyl group, use may be made of a precursor having a carboxyl group and a precursor modified with a carboxyl group. As an alkenyloxy structure, use may be made of vinylether, allyl ether, and structures derived from these. A compound having two or more alkenyloxy structures may be used.

Furthermore, alkenyl ether derivatives such as bis[4-(vinyloxy)butyl]adipate and bis[4-(vinyloxy)butyl]succinate may be used as a cross-linking agent.

These functional groups can form a thermo-reversible cross-linking structure, as shown in the following general reaction scheme (VI). In the general reaction scheme (VI), a carboxyl group and a vinylether group form hemiacetal ester serving as a crosslink (see, Japanese Patent Laid-Open No. 11-35675 (Patent Document 7) and Japanese Patent Laid-Open No. 60-179479). The Td of the crosslink is from 100° C. to 250° C. and can be controlled by a cross-linking structure.

[Formula 6]

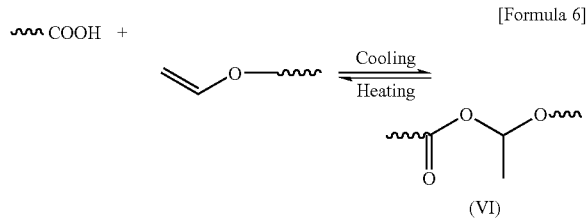

(VI)

(Cross-linking Agent)

As explained above, a compound having at least two functional groups capable of forming a thermo-reversible crosslink can be used as a cross-linking agent.

Examples of a cross-linking agent having an acid anhydride group include a bisphthalic anhydride compound, bissuccinic anhydride compound, bisglutaric anhydride compound, bismaleic anhydride compound, and substituents of these.

Examples of a cross-linking agent having a hydroxyl group include dihydric alcohols such as ethylene glycol, propylene glycol, dipropylene glycol, 1,3- and 1,4-butanediol, and 1,6-hexanediol; trihydric alcohols such as glycerin, trimethylolpropane, trimethylolethane, and hexanetriol; tetrahydric alcohols such as pentaerythritol, methyl glycoside, and diglycerin; polyglycerins such as triglycerin and tetraglycerin; polypentaerythritols such as dipentaerythritol and tripentaerythritol; cycloalkane polyols such as tetrakis(hydroxymethyl)cyclohexanol; and polyvinyl alcohol. Furthermore, mention may be made of sugar alcohols such as adonitol, arabitol, xylitol, sorbitol, mannitol, iditol, talitol, and dulcitol; and saccharides such as glucose, mannoseglucose, mannose, fructose, sorbose, sucrose, lactose, raffinose, and cellulose.

Examples of a cross-linking agent having a carboxyl group include oxalic acid, malonic acid, succinic acid, glutaric acid, adipic acid, phthalic acid, maleic acid and fumaric acid.

Examples of a cross-linking agent having a vinylether group include bis[4-(vinyloxy)butyl]adipate and bis[4-(vinyloxy)butyl]succinate, ethylene glycol divinyl ether, butanediol divinyl ether, 2,2-bis[p-(2-vinyloxyethoxy)phenyl]propane, and tris[4-(vinyloxy)butyl]trimellitate.

Examples of a cross-linking agent having a phenolic hydroxyl group include monocyclic polyphenols such as dihydroxy benzene, pyrogallol, and phloroglucin; bisphenols such as dihydroxy biphenyl, bisphenol A, and bisphenol sulfone; and resole-type phenol resins and novorak phenol resins.

Examples of a cross-linking agent having an isocyanate group, particularly a bifunctional isocyanate group, include aromatic diisocyanates such as 2,4-tolylene diisocyanate, 2,6-tolylene diisocyanate, 4,4'-diphenylmethane diisocyanate, 2,4'-diphenylmethane diisocyanate, and p-phenylene diisocyanate; aliphatic diisocyanates such as hexamethylene diisocyanate and lysine diisocyanate; alicyclic diisocyanates such as isophorone diisocyanate; and aryl aliphatic diisocyanates such as xylylene diisocyanate. Examples of a cross-linking agent having a trifunctional isocyanate include trimers such as 1-methylbenzene-2,4,6-triisocyanate, naphthalene-1,3,7-triisocyanate, biphenyl-2,4,4'-triisocyanate, triphenylmethane-4,4'-4''-triisocyanate, and tolylene diisocyanate; and lysine triisocyanate.

Examples of a cross-linking agent having an azlactone group include bisazlactonebutane, bisazlactonebenzene, and bisaziactonehexane.

Examples of a cross-linking agent having a nitroso group include dinitroso propane, dinitroso hexane, dinitroso benzene and dinitroso toluene.

(Selection of Cross-linking Structure)

As a reversible reaction in which a crosslink is formed by cooling and dissociated by heating, use may be made of the Diels-Alder reaction, nitroso dimerization reaction, acid anhydride ester reaction, urethanization reaction, azlactone-hydroxyaryl reaction and carboxyl-alkenyloxy reaction as mentioned above.

However, it is better to avoid using chemical reactions which causes deterioration of a main chain due to a cause such as thermal decomposition and hydrolysis and inactivating a cross-linking due to a side reaction. To explain more specifically, polyester resins such as polylactic acid and polycarbonate are hydrolyzed by a carboxylic acid. Therefore, an acid anhydride esterification is not suitable for forming a crosslink. To a resin having numerous hydroxyl groups, such as polyvinyl alcohol, urethanization reaction, azlactone-hydroxylaryl reaction and carboxyl-alkenyloxy reaction cannot be applied, since a hardening reaction takes place. On the other hand, the Diels-Alder reaction, since it is performed in hydrophobic conditions, can be applied to a resin susceptible to hydrolysis. Since a reactive group is not inactivated by moisture or the like, the Diels-Alder reaction can be applied to various resins. Also, it can be suitably used in biomass-derived resin having numerous ester bonds.

(Resin)

As a crosslinkable resin as mentioned above, use may be made of a rein whose Tg falls within the range of 40° C.≦Tg≦200° C. Specific examples of such a resin include polycarbonate, methyl polymethacrylate, ethyl polymethacrylate, polystyrene, polyacrylic acid, polyacrylonitrile, polyvinyl alcohol, polyvinyl chloride, polyvinyl pyrrolidone, 6-nylon, 6,6-nylon, polyethylene terephthalate, polyurethane, triacetyl cellulose, trinitro cellulose, and polylactic acid. These may be used alone or in combination of two types or more. When a biodegradable resin such as triacetyl cellulose, trinitro cellulose, and polylactic acid is used, a biodegradable cross-linked material can be obtained. A biomass-derived resin such as polylactic acid resin is more preferable than a petroleum-derived resin, from an environmental point of view.

Furthermore, even if a resin having a Tg of less than 40° C. by itself, Tg can be controlled by copolymerizing or blending the resin with a resin having a high Tg. Moreover, even if a resin having a high Tg, Tg can be controlled by adding a plasticizer to the resin.

Furthermore, Tg can be controlled by modifying the cross-linking structure of a resin. For example, Tg of the resin can be increased by reducing the molecular weight of a precursor and increasing the number of functional groups of a precursor, thereby increasing the crosslink density. Conversely, Tg of the resin can be decreased by increasing the molecular weight of a precursor and decreasing the number of functional groups of a precursor, thereby decreasing the crosslink density.

In the aforementioned manner, the Tg of a cross-linked resin can be controlled from 40° C. to 200° C. The Tg is preferably from 40° C. to 100° C. and further preferably not more than 80° C. in practice.

The number average molecular weight (hereinafter, referred to as "molecular weight") of the precursor falls within the range of 100 to 1,000,000, preferably 1,000 to 100,000, and further preferably, 2,000 to 50,000. If the molecular weight of a precursor is less than 100, mechanical characteristics and processability of a resin may decrease. In contrast, if the molecular weight exceeds 1,000,000, the crosslink density decreases, with the result that satisfactory shape-memory properties may not be obtained.

In view of shape-memory properties and heat resistance, a three-dimensional cross-linking structure is preferable as a cross-linking structure. The crosslink density of the three-dimensional cross-linking structure can be set at a desirable value by specifying the number of functional groups of a resin material and a mixing ratio of materials at predetermined values. The crosslink density of the three-dimensional cross-linking structure is represented by a mole number of cross-linking points of the three-dimensional structure contained in 100 g of a resin. More specifically, the value of (the number of functional groups—2) per molecule of a raw material is used as the mole number of the crosslinks. To attain sufficient shape memory properties, the crosslink density is preferably 0.0001 or more, and further preferably 0.001 or more. On the other hand, the crosslink density is preferably 1 or less, and particularly preferably, 0.3 or less. When the crosslink density is less than 0.0001, a network structure cannot be formed, with the result that shape recovery is rarely attained. On the other hand, if the crosslink density is larger than 1, a sufficient elasticity (like a rubber) may not be obtained at a temperature of Tg or more. As a result, the resin cannot deform and fails to serve as a shape-memory resin.

A cross-linked compound that can be used is defined by the ratio of storage modulus G'(Pa) of lower Tg to upper Tg. The ratio of G'(Tg)/G'{Tg+20° C.} falls within the range of $1.0 \times 10^1$ to $1.0 \times 10^7$, and preferably within $2.0 \times 10^1$ to $1.0 \times 10^5$. At a temperature of Tg or more, G' decreases due to entropy elasticity based on the micro-Brownian motion. On the contrary, when the temperature of Tg or less, G' increases due to energy elasticity. In this manner, the ratio of G' of lower Tg to upper Tg can be used as an index for easiness in deformation. When the ratio is less than $1.0 \times 10^1$, a resin does not exhibit sufficient elasticity (rubber like elasticity) and rarely deformed even if the temperature falls within the range of Tg or more. In contrast, when the ratio is larger than $1.0 \times 10^7$, a network structure cannot be formed, with the result that a resin loses shape memory properties.

In obtaining a shape-memory resin according to the present invention, if necessary, inorganic filler, organic filler, reinforcing material, coloring agent, stabilizer (radical scavenger, antioxidant), antimicrobial, fungicide, and flame-retardant may be used in combination as long as desired properties are ensured. Examples of the inorganic filler that may be used include silica, alumina, talk, sand, clay, and slag. Examples of the organic filler that may be used include organic fibers such as polyamide fiber and plant fiber. Examples of the reinforcing material that may be used include glass fiber, carbon fiber, polyamide fiber, polyarylate fiber, needle inorganic material, and fibrous fluorine resin. Examples of the antimicrobial that may be used include silver ion, copper ion and zeolite containing these. Example of the flame retardant that may be used include silicone based flame retardant, bromine based flame retardant, phosphorus based flame retardant, and inorganic flame retardant.

The resin and resin compositions mentioned above can be molded into various formed product such as applications for electric/electronic apparatus such as cases for electric appliances by a general molding method for a thermoplastic resin such as injection molding, film formation, blow molding, and foam molding.

EXAMPLES

The present invention will be explained in more detail by way of Examples, which will not be construed as limiting the present invention. Note that unless otherwise specified, reagents were commercially available highly purified product. Note that number average molecular weight was determined by gel permeation chromatography and converted in terms of standard polystyrene. Performance was evaluated in accordance with the following methods.

Glass transition temperature (Tg), dissociation temperature (Td): Glass transition temperature (Tg) was measured and determined by use of DSC measurement device (trade name: DSC 6000, manufactured by Seiko Instruments Inc.) at a temperature-raising rate of 10° C./minute. The endothermic peak was determined as a dissociation temperature (Td).

Storage Modulus:

Storage modulus was measured using a test piece of 1.8 mm thick by viscoelasticity measurement device (trade name: "Rheolograph-Solid S-1" manufactured by Toyo Seiki Seisaku-sho, LTD) at 10 Hz and a temperature-raising rate of 2° C./minute.

Shape-memory Properties:

A shape-memory film of 2 cm×5 cm×1.8 mm was prepared. The film was heated to Tg+20° C., folded into half with an angle of 90°, allowed to deform for 5 seconds, and cooled to room temperature. The deformed proportion was evaluated based on an angle (A1). In the case where an angle was 80°≦A1≦90°, the deformed proportion was indicated by an open circle. In the case of 70°≦A1<80°, it was indicated by an open triangle. In the case of 0°≦A1<70°, it was indicated by a cross. The deformed film was again heated to Tg+20° C. for 10 seconds and the recovery properties were evaluated by an angle (A2). In the case where an angle was 0°≦A2≦10°, the recovery properties were indicated by an open circle. In the case of 10°<A2≦20° was indicated by an open triangle. In the case of 20°<A2≦90° was indicated by a cross.

Remoldability:

The film was melted at 200° C. and remolded into a circular film of 1.8 cm in radius. The remolded film was evaluated for deformed proportion (A3) and recovery properties (A4) in the same manner as above.

Examples for polylactic acid used as a precursor will be shown below. Polylactic acid has preferable from an environmental point of view since it is biodegradable and biomass-derived material. To impart excellent shape memory properties and recycling efficiency to a polylactic acid, material design was performed as follows. Since thermal decomposition of polylactic acid takes place at 200° C. or more, a type of reversible crosslink was selected so as to have a dissociation temperature (Td) of 50° C. to 200° C. As a reversible reaction, use may be made of the Diels-Alder reaction, carboxyl-alkenyloxy reaction and urethanization reaction. Subsequently, a reversible crosslink was introduced to form a three-dimensional crosslink. At this time, the Tg of the resin was controlled so as to fall within the range of 40° C. to 100° C. Finally, the shape memory properties and recycling efficiency of the cross-linked resin were evaluated.

Now, Example in which a furan-maleimide bond, which is classified as the Diels-Alder reaction, was introduced into polylactic acid will be explained below. The dissociation temperature of the furan-maleimide bond is specified as 80° C. or 140° C. in a document (Non-Patent Document 2): however, it was about 150° C. as shown in the following Example. The crosslink is suitable for a polylactic-based resin.

Example 1

First, 1000 g of commercially available polylactic acid (trade name: Lacty®, manufactured by Shimadzu Corporation) and 75.6 g of pentaerythritol were melted to mix at 200° C. for 3 hours. In this manner, a transesterification was performed. The resultant mixture was dissolved in 1 L of chloroform and then poured in excessive methanol to reprecipitate Polylactic acid [R1] with hydroxyl end.

Subsequently, 100 g of 2-furfuryl alcohol, 112 g of succinic anhydride, and 2 ml of pyridine were dissolved in 1 L of chloroform and heated under reflux for 10 hours. This solution was washed with water and the solvent was distilled off to synthesize a furan derivative [F1]. To 500 ml of chloroform, 31.4 g of 1-ethyl-3-(3'-dimethylaminopropyl)carbodiimide hydrochloride (WSC), 13.0 g of pyridine, 32.5 g of [F1] and 100 g of [R1] were added and heated under reflux for 10 hours. The resultant solution was washed with water, dried over magnesium sulfate, and the solvent was distilled off to obtain furan-modified polylactic acid [R2] (molecular weight: 2100).

After 25 ml of tris(2-aminoethyl)amine dissolved in 100 ml of dimethylformamide (DMF) was heated to 75° C., 100 g of exo-3,6-epoxy-1,2,3,6-tetrahydrophthalic anhydride dissolved in 250 ml of DMF was added dropwise to the mixture over one hour and stirred for 2 hours. To this solution, 200 ml of acetic anhydride, 10 ml of triethylamine, 1 g of nickel acetate were added and stirred for 3 hours. After stirring, 1000 ml of water was added and the solvent was distilled off under reduced pressure at 60° C. The reaction mixture was dissolved in chloroform and the washed with water. After chloroform was distilled off under reduced pressure, purification was performed by silica gel column chromatography. After the purified product was further heated under reflux in toluene under a nitrogen atmosphere for 24 hours, trifunctional maleimide [R3] was obtained by recrystallization (yield: 52%).

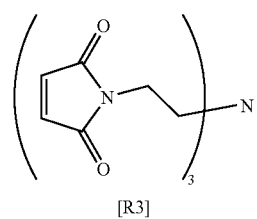

[Formula 7]

[R3]

First 26.0 g of [R2] and 4.96 g of [R3] synthesized above were weighed, melted to mix at 170° C. for 3 minutes, and cross-linked at 100° C. for one hour to obtain a cross-linked product [R4] of polylactic acid through the Diels-Alder reaction. The Tg was 51° C. and the Td was 149° C. The crosslink density was 0.127.

Furthermore, the cross-linked product [R4] was melted at 180° C. and cross-linked at 100° C. for 2 hours to manufacture a film for evaluating shape-memory properties. The evaluation results are shown in Table 1.

Example 2

First, 2,000 g of commercially available polylactic acid and 178 g of sorbitol were melted to mix at 200° C. for 15 hours. In this manner, a transesterification was performed. The resultant mixture was dissolved in 2 L of chloroform and then poured in excessive methanol to reprecipitate Polylactic acid [R5] with hydroxyl end.

Subsequently, to 400 ml of chloroform, 72 g of WSC, 30.0 ml of pyridine, 74.2 g of [F1], and 132 g of [R5] were added and heated under reflux for 43 hours. This solution was washed with water, and dried over magnesium sulfate, and thereafter, the solvent was distilled off to obtain furan modified polylactic acid [R6] (molecular weight: 6940).

Then, 10.3 g of the [R6] and 1.20 g of [R3] synthesized above were weighed, melted to mix at 170° C. for 3 minutes, cross-linked at 100° C. for one hour to obtain a cross-linked product [R7] of polylactic acid through the Diels-Alder reaction. The Tg was 65° C. and the Td was 155° C. The crosslink density was 0.0795.

Furthermore, the cross-linked product [R7] was melted at 160° C. and cross-linked at 100° C. for one hour to manufacture a film for evaluating shape-memory properties. The evaluation results are shown in Table 1.

Example 3

First, 2,000 g of commercially available polylactic acid and 197 g of sorbitol were melted to mix at 200° C. for 15 hours.

In this manner, a transesterification was performed. The resultant mixture was dissolved in 2 L of chloroform and then poured in excessive methanol to reprecipitate polylactic acid [R8] with hydroxyl end.

Subsequently, to 500 ml of chloroform, 72.3 g of WSC, 30.0 ml of pyridine, 74.5 g of [F1], and 120 g of [R8] were added and heated under reflux for 43 hours. This solution was washed with water and dried over magnesium sulfate and thereafter, the solvent was distilled off to obtain furan modified polylactic acid [R9] (molecular weight: 6286).

Then, 10.0 g of [R9] and 1.23 g of [R3] synthesized above were weighed, melted to mix at 170° C. for 3 minutes, cross-linked at 100° C. for one hour to obtain a cross-linked product [R10] of polylactic acid through the Diels-Alder reaction. The Tg was 70° C. and the Td was 154° C. The crosslink density was 0.0850.

Furthermore, the cross-linked product [R10] was melted at −160° C. and cross-linked at 100° C. for one hour to manufacture a film for evaluating shape-memory properties. The evaluation results are shown in Table 1.

Example 4

To 50 ml of THF, 45.7 g of L-lactic acid, 55.8 g of maleic anhydride, and 2 ml of pyridine were added and heated under reflux for 9 hours. To the reaction solution, 100 ml of water was added and THF was distilled off by an evaporator, and then, 200 ml of chloroform was added. The solution was neutralized with an aqueous hydrochloric acid solution. After the water phase was concentrated by an evaporator and dissolved in acetone, a solid matter was filtrated. After the filtrate was concentrated again by an evaporator, it was dissolved in ethyl acetate to filtrate a solid matter. The filtrate was concentrated by an evaporator to obtain dicarboxylic acid derivative [F2].

To 100 ml of chloroform, 11.0 g of WSC, 4.6 ml of pyridine, 5.62 g of furfuryl alcohol, 4.95 g of [F2] were added and heated under reflux for 13 hours. The resultant mixture was washed with an aqueous sodium hydroxide solution and an aqueous hydrochloric acid solution, and dried over magnesium sulfate. Thereafter, the solvent was distilled off to obtain difuran derivative [R11].

Then, 10.8 g of [R11] synthesized above and 7.93 g of [R3] were weighed, melted to mix at 170° C. for 3 minutes, cross-linked at 100° C. for one hour to obtain a cross-linked product [R12] through the Diels-Alder reaction. The Tg was 81° C. and the Td was 155° C. The crosslink density was 0.110.

Furthermore, the cross-linked product [R12] was melted at 160° C and cross-linked at 100° C. for one hour to form a film for evaluating shape-memory properties. The results are shown in Table 1.

Example 5

First, 500 g of commercially available polylactic acid and 535 g of sorbitol were melted to mix at 200° C. for 20 hours. In this manner, a transesterification was performed. The resultant mixture was dissolved in 1 L of chloroform and then poured in excessive methanol to obtain polylactic acid [R13] with hydroxyl end.

Subsequently, to 500 ml of chloroform, 113 g of WSC, 47.7 ml of pyridine, 117 g of [F1], and 100 g of [R13] were added and heated under reflux for 35 hours. This solution was washed with water and dried over magnesium sulfate, and then, the solvent was distilled off to obtain furan modified polylactic acid [R14] (molecular weight: 1695).

Then, 10.0 g of the [R14] and 4.56 g of [R3] synthesized above were weighed, melted to mix at 170° C. for 3 minutes, cross-linked at 100° C. for one hour to obtain a cross-linked product [R15] of polylactic acid through the Diels-Alder reaction. The Tg was 92° C. and the Td was 157° C. The crosslink density was 0.243.

Furthermore, the cross-linked product [R15] was melted at 160° C. and cross-linked at 100° C. for one hour to manufacture a film for evaluating shape-memory properties. The evaluation results are shown in Table 1.

Example 6

First, 10.0 g of the [R6] and 0.0350 g of [R3] synthesized above were weighed, melted to mix at 170° C. for 3 minutes, cross-linked at 100° C. for one hour to obtain a cross-linked product [R16] of polylactic acid through the Diels-Alder reaction. The Tg was 47° C. and the Td was 152° C. The crosslink density was 0.000902.

Furthermore, the cross-linked product [R16] was melted at 160° C. and cross-linked at 100° C. for one hour to manufacture a film for evaluating shape-memory properties. The evaluation results are shown in Table 1.

Comparative Example 1

Commercially available polylactic acid was melted at 200° C. and heated at 100° C. for one hour to form a film for evaluation. The evaluation results are shown in Table 1.

[Shape Memory Properties]

The seven Examples mentioned above were evaluated for shape memory properties, shape-recovering properties, and remoldability (Table 1).

TABLE 1

Table 1 Evaluation of shape memory properties and remoldability

| Crosslinked product | Crosslink density | Tg (° C.) | Td (° C.) | Deformation Temp. (° C.) | Shape memory properties | | Remoldability | | Ratio of strage moduluses |
| --- | --- | --- | --- | --- | --- | --- | --- | --- | --- |
| | | | | | Deform (A1) | Recovery (A2) | Deform (A3) | Recovery (A4) | |
| Example 1 | 0.127 | 51 | 149 | 71 | ○ | ○ | ○ | ○ | 22.1 |
| Example 2 | 0.0795 | 65 | 155 | 85 | ○ | ○ | ○ | ○ | 101 |
| Example 3 | 0.085 | 70 | 154 | 90 | ○ | ○ | ○ | ○ | 150 |
| Example 4 | 0.11 | 81 | 155 | 101 | ○ | ○ | ○ | ○ | 80.5 |
| Example 5 | 0.243 | 92 | 157 | 112 | Δ | ○ | Δ | ○ | 20.4 |
| Example 6 | 0.0009 | 47 | 152 | 67 | ○ | Δ | ○ | Δ | 442 |
| Comp. Ex. 1 | 0 | 55 | — | 75 | x | x | x | x | 2.91 |

As is apparent from Table 1, shape-memory resins of Examples 1 to 6 are excellent in shape-recovering properties and remoldability. Each of the shape-memory resins is composed of a polylactic acid based resin excellent in biodegradability, so that they are excellent in biodegradability. In Examples 1 to 6, the Tg value of each resin was successfully controlled in a practical range from 40 to 100° C. The Tg of a resin was increased by increasing the crosslink density (Examples 2 to 4). The Tg of a resin was increased also by increasing the number of functional groups of a precursor. On the other hand, in Comparative Example 1, since the ratio of storage modulus was low, a resin was not deformed and inferior in shape-recovering properties since no crosslink was formed.

Next, Examples where a reversible crosslink formed through a carboxyl-alkenyloxy reaction was introduced into a polylactic acid, will be explained.

Example 7

First, 490.2 g of commercially available polylactic acid and 9.31 g of L-lactic acid were melted to mix at 200° C. for 3 hours. In this manner, a transesterification was performed. The resultant mixture was dissolved in chloroform and then poured in methanol to reprecipitate polylactic acid [R17] (molecular weight: 18300).

Then, 10.0 g of the polylactic acid [R17] and 0.42 g of Tris[4-(vinyloxy)butyl]trimellitate (Trade name: VEctomer® 5015, manufactured by Aldrich) were weighed, melted to mix at 180° C. for 10 minutes, and cross-linked at 100° C. for 2 hours to obtain closslinked polylactic acid through a carboxyl-vinylether reaction [R18]. The Tg was 52° C. and the Td was 180° C. The crosslink density was 0.00358.

Furthermore, the cross-linked product [R18] was melted at 190° C. and cross-linked at 100° C. for 2 hours to form a film for evaluating shape-memory properties. The results are shown in Table 2.

Example 8

First, 450 g of commercially available polylactic acid and 39.8 g of L-lactic acid were melted to mix at 200° C. for 3 hours. In this manner, a transesterification was performed. After dissolved in chloroform, the mixture was poured in methanol to reprecipitate polylactic acid [R19] (molecular weight: 6300).

Then, 10.0 g of the polylactic acid [R19] and 0.53 g of VEctomer® 5015 were weighed, melted to mix at 180° C. for 10 minutes, cross-linked at 100° C. for 2 hours to obtain cross-linked polylactic acid through a carboxyl-vinylether reaction [R20]. The Tg was 60° C. and the Td was 182° C. The crosslink density was 0.0100.

Furthermore, the cross-linked product [R20] was melted at 190° C. and cross-linked at 100° C. for 2 hours to form a film for evaluating shape-memory properties. The results are shown in Table 2.

Example 9

First, 500 g of commercially available polylactic acid (trade name: Lacty®, manufactured by Shimadzu Corporation) and 294 g of L-lactic acid were melted to mix at 200° C. for 3 hours. In this manner, a transesterification was performed. After dissolved in chloroform, the mixture was poured in methanol to reprecipitate polylactic acid [R21] (molecular weight: 2420).

Then, 10.0 g of the polylactic acid [R21] and 1.39 g of VEctomer® 5015 were weighed, melted to mixed at 180° C. for 10 minutes, cross-linked at 100° C. for 2 hours to obtain closslinked polylactic acid [R22] through a carboxyl-vinylether reaction. The Tg was 72° C. and the Td was 180° C. The crosslink density was 0.0242.

Furthermore, the cross-linked product [R22] was melted at 190° C. and cross-linked at 100° C. for 2 hours to form a film for evaluating shape-memory properties. The results are shown in Table 2.

[Shape Memory Properties]

The three Examples mentioned above were evaluated for shape memory properties, shape-recovering properties, and remoldability (Table 2).

TABLE 2

Table 2: Evaluation of shape memory properties and remoldability

| Crosslinked product | Crosslink density | Tg (° C.) | Td (° C.) | Deformation Temp. (° C.) | Shape memory properties | | Remoldability | | Ratio of strage moduluses |
|---|---|---|---|---|---|---|---|---|---|
| | | | | | Deform (A1) | Recovery (A2) | Deform (A3) | Recovery (A4) | |
| Example 7 | 0.00358 | 52 | 180 | 72 | ○ | ○ | ○ | ○ | 51.2 |
| Example 8 | 0.01 | 60 | 182 | 80 | ○ | ○ | ○ | ○ | 41.8 |
| Example 9 | 0.0242 | 72 | 180 | 92 | ○ | ○ | ○ | ○ | 37.1 |

As is apparent from Table 2, the shape-memory resins of Examples 7 to 9 are excellent in shape-recovering properties and remoldability. Each of them is composed of a polylactic acid based resin excellent in biodegradability, so that they are excellent in biodegradability. In Examples 7 to 9, the Tg value of each resin was successfully controlled in a practical range from 40 to 100° C. The Tg of a resin was increased by increasing the crosslink density in the same manner as in Examples 2 to 4.

Next, Examples and Comparative Examples where resins (polystyrene, polycarbonate) other than polylactic acid were used will be explained.

Example 10

A tetrahydrofuran (THF) solution of K-naphthalene (1.20 g) was used as a polymerization initiator. To this, a THF solution of styrene (20.0 g) was added under high vacuum at −78° C. and the solution mixture was allowed to stand still for 30 minutes. To this solution mixture, a THF solution of 4-bromo-1,1,1-trimethoxybutane (manufactured by Aldrich) was added dropwise as a terminator and the mixture was allowed to stand at −78° C. for 12 hours and at 30° C. for one hour. Reprecipitation was performed with methanol to obtain polystyrene [R23] with trimethoxy end.

The polystyrene [R23] (16.0 g) was dissolved in THF. To this solution, LiOH (1.22 g) was added and allowed to react at 30° C. for 20 hours, followed by neutralizing it with 0.1N hydrochloric acid to obtain polystyrene [R24] having a carboxylic acid end.

Subsequently, to 12.0 g of [R24], 100 ml of chloroform, 1.01 g of WSC, 0.41 g of pyridine, and 1.06 g of 2-furfuryl alcohol were added and heated under reflux for 10 hours. This solution was purified with an aqueous hydrochloric acid solution and aqueous sodium hydroxide solution, and then, the solvent was distilled off to obtain furan-modified polystyrene [R25] (molecular weight: 5000).

Then, 10.0 g of [R25] synthesized above and 1.54 g of [R3] produced in Example 1 were weighed, melted to mix at 170° C. for 3 minutes, and cross-linked at 100° C. for 2 hours to obtain a cross-linked product [R26] of polystyrene through the Diels-Alder reaction. The Tg was 70° C. and the Td was 145° C. The crosslink density was 0.0127.

Furthermore, the cross-linked product [R26] was melted at 180° C. and cross-linked at 100° C. for 2 hours to manufacture a film for evaluating shape-memory properties. The evaluation results are shown in Table 3.

Example 11

First, 1000 g of commercially available polycarbonate (manufactured by Sumitomo-Dow Limited) was soaked in 2 L of an aqueous ammonia solution adjusted at pH 10-12 (weak alkali) for 4 hours and the aqueous solution was removed. The polycarbonate was melted to mix at 280° C. to obtain a low molecular-weight polycarbonate [R27] (molecular weight: 2000).

Then, 100 g of polycarbonate [R27] and 21.5 g of 1-methylbenzene-2,4,6-triisocyanate were melted to mix at 180° C. for 5 minutes, and cross-linked at 100° C. for 2 hours to obtain a polycarbonate [R28] cross-linked with isocyanate. The Tg was 150° C. and the Td was 185° C. The crosslink density was 0.0311.

Furthermore, the cross-linked product [R28] was melted at 200° C. and cross-linked at 100° C. for 2 hours to manufacture a film for evaluating shape-memory properties. The evaluation results are shown in Table 3.

Comparative Example 2

First, 20.1 g of [R1] produced in Example 1 and 4.17 g of tolylenediisocyanate (TDI) were weighed and heated at 100° C. for one hour and at 160° C. for one hour to obtain a film composed of nonreversible urethane cross-linked product [R29] of polylactic acid. The Tg was 70° C.

Comparative Example 3

To 500 ml of a chloroform solution in which low-molecular weight polycarbonate [R27] obtained in Example 9 was dissolved, 12.5 g of succinic anhydride and 0.1 g of dimethylaminopyridine were added and heated under reflux for 5 hours. After the solution was washed with water and dried over magnesium sulfate, the solvent was distilled off to obtain polycarbonate [R30] with carboxyl end.

The [R30] (50 g) thus obtained was dissolved in 300 ml of chloroform. To the mixture, 4.91 g of 2-furfuryl alcohol, 9.59 g of WSC, and 3.95 g of pyridine were added and the mixture was heated under reflux for 10 hours. After the solution was washed with water, the solvent was distilled off to obtain furan-modified polycarbonate [R31] (molecular weight: 2600).

Then, 10.0 g of [R31] thus obtained and 1.07 g of the [R3] obtained in Example 1 were weighed and melted to mix at 190° C. for 10 minutes to obtain a polycarbonate product [R32] cross-linked through the Diels-Alder reaction. The Tg was 145° C. and the Td was 151° C. The crosslink density was 0.0233.

Furthermore, the cross-linked product [R32] was melted at 180° C. and cross-linked at 100° C. for 2 hours to manufacture a film for evaluating shape-memory properties. The evaluation results are shown in Table 3.

Comparative Example 4

A commercially available thermoplastic shape-memory resin (trade name: DiAPLEX®, manufactured by Mitsubishi Heavy Industries, Ltd.) was melted at 200° C. to produce a film for evaluation.

Comparative Example 5

A commercially available thermosetting shape-memory resin (trade name: Kuraprene® HM sheet, manufactured by Kuraray Co., Ltd.) was used to produce a film for evaluation.

[Shape Memory Properties]

The six examples mentioned above were evaluated for shape memory properties, shape-recovering properties, and remoldability (Table 3).

TABLE 3

Evaluation of shape memory properties and remoldability

| Crosslinked product | Crosslink density | Tg (° C.) | Td (° C.) | Deformation Temp. (° C.) | Shape memory properties | | Remoldability | | Ratio of strage moduluses |
|---|---|---|---|---|---|---|---|---|---|
| | | | | | Deform (A1) | Recovery (A2) | Deform (A3) | Recovery (A4) | |
| Example 10 | 0.127 | 70 | 145 | 90 | ○ | ○ | ○ | ○ | 45.0 |
| Example 11 | 0.0311 | 150 | 185 | 170 | ○ | ○ | ○ | ○ | 35.9 |
| Comp. Ex. 2 | 0.0817 | 70 | — | 90 | ○ | ○ | Not able to remold | | 25.7 |
| Comp. Ex. 3 | 0.0233 | 145 | 151 | >145 | X | X | X | X | >1 × 10$^7$ |
| Comp. Ex. 4 | — | 55 | — | 75 | ○ | X | ○ | X | 31.8 |
| Comp. Ex. 5 | — | 67(MP) | — | 87 | ○ | ○ | Not able to remold | | 10.4 |

As is apparent from Table 3, the shape-memory resins of Examples 10 and 11 are excellent in shape-recovering properties and remoldability. Since the resins of Comparative Examples 2 and 5 are composed of a thermosetting resin, they could not be remolded. Furthermore, in Comparative Example 3 in which the difference between Tg and Td values less than 10° C., a crosslink is dissociated when temperature fell within the deformable temperature range as high as Tg or more. Therefore, the resin did not exhibit shape memory properties. Since the resin of Comparative Example 4 is a thermoplastic resin, the shape-recovering properties were poor.

INDUSTRIAL APPLICABILITY

The product of the present invention having an excellent shape memory properties can be used in various molded products such as members for an electronic apparatus, such as exterior materials for electronic appliances (personal computers, mobile phones, etc.,), screws, fastening pins, switches, sensors, information recording devices, and parts such as a roller and belt etc. of OA appliances, sockets, packaging materials such as pallets, open/shut valves for air conditioning machines and thermal contraction tubes. Other then these, it can be used in various types of fields including automobile parts such as a bumper, handle, and rearview mirror; plaster casts; toys; eye glass frames, wire for straightening teeth, household good such as bedclothes for preventing bed-sore.

The invention claimed is:

1. A shape-memory resin having a glass transition temperature (Tg) within the range of 40° C. to 200° C. and crosslinked by a thermoreversible reaction in which a covalent bond is formed by cooling and dissociated by heating, wherein a dissociation temperature (Td) of the thermoreversible reaction is 50° C. to 300° C. and satisfying the relationship: Tg+10° C.≦Td; and a transforming temperature at shape memorizing and shape recovering is not less than Tg and less than Td.

2. The shape-memory resin according to claim 1, wherein the thermoreversible reaction is at least one type of reaction selected from the group consisting of Diels-Alder reaction, nitroso dimerization reaction, acid anhydride esterification reaction, urethanization reaction, azlactone-hydroxyaryl reaction and carboxyl-alkenyloxy reaction.

3. The shape-memory resin according to claim 1, wherein the resin is reshapable at a temperature of Td to less than the decomposition temperature of the resin.

4. The shape-memory resin according to claim 1, wherein the resin is biodegradable.

5. The shape-memory resin according to claim 4, wherein the resin is composed of a plant-derived resin as a raw material.

6. The shape-memory resin according to claim 5, wherein the resin is composed of polylactic acid as a raw material.

7. The shape-memory resin according to claim 6, wherein the resin is a crosslinked product of polylactic acid in a cool state obtained through the Diels-Alder reaction.

8. The shape-memory resin according to claim 6, wherein the resin is a crosslinked product of polylactic acid in a cool state obtained through a carboxyl-alkenyloxy reaction.

9. The shape-memory resin according to claim 1, wherein the resin has a Tg of 40° C. to 100° C.

10. The shape-memory resin according to claim 1, wherein the resin in a cool state has a crosslink density of 0.0001 to 1.

11. A shaped product composed of a crosslinked product of the shape-memory resin according to claim 1.

12. A shaped product obtained by shaping the crosslinked product of the shape-memory resin according to claim 1 into a predetermined shape to be memorized at a temperature of Td to less than the decomposition temperature of the resin, transforming the shaped product obtained at a temperature of not less than Tg and less than Td, and cooling the transformed product to a temperature less than Tg, thereby fixing a transformed shape.

13. A method of using a shaped product of a shape-memory resin wherein the shaped product according to claim 12 is heated to a temperature of not less than Tg and less than Td, thereby recovering a predetermined original shape memorized.

14. A method of reshaping a shaped product of a shape-memory resin wherein the shaped product according to claim 11 is melted at a temperature from Td to less than the decomposition temperature of the resin.

15. A method of reshaping a shaped product of a shape-memory resin wherein the shaped product according to claim 12 is melted at a temperature from Td to less than the decomposition temperature of the resin.

* * * * *